United States Patent [19]

Deering

[11] Patent Number: 5,287,437
[45] Date of Patent: Feb. 15, 1994

[54] METHOD AND APPARATUS FOR HEAD TRACKED DISPLAY OF PRECOMPUTED STEREO IMAGES

[75] Inventor: Michael Deering, Los Altos, Calif.

[73] Assignee: Sun Microsystems, Inc., Mountain View, Calif.

[21] Appl. No.: 893,196

[22] Filed: Jun. 2, 1992

[51] Int. Cl.⁵ .................................................. G06F 12/02
[52] U.S. Cl. ..................................... 395/127; 395/119
[58] Field of Search ................. 395/127; 358/222, 88, 358/92, 103, 104

[56] References Cited

U.S. PATENT DOCUMENTS

| | | | |
|---|---|---|---|
| 4,855,822 | 8/1989 | Narendra et al. | 358/103 |
| 4,873,585 | 10/1989 | Blanton et al. | 358/335 |
| 4,987,487 | 1/1991 | Ichinose et al. | 358/92 |
| 5,075,776 | 12/1991 | Cheung | 358/222 |

OTHER PUBLICATIONS

Paley, W. B., Head-tracking Stereo Display, Techniques and Applications, Proceedings of SPIE, Feb. 1992, pp. 84–89.

Foley, J. D., Van Dam, A., Feiner, S. K., and Hughes, J. F., Computer Graphics: Principles and Practice, 2nd edition, pp. 229–242, Addison-Wesley, 1990.

Primary Examiner—Gary V. Harkcom
Assistant Examiner—Mike Smith
Attorney, Agent, or Firm—Blakely Sokoloff Taylor & Zafman

[57] ABSTRACT

A method and apparatus for generating complex 3D stereo images in response to real time viewer head movement by dynamically accessing pairs of stereo images selected from among a precomputed set of images. The precomputed images correspond to a predetermined set of possible viewpoints, and are accessed based upon a prediction of viewer head movement. The arrangement of predetermined viewpoints may be along one, two, or three dimensions.

16 Claims, 9 Drawing Sheets

METHOD AND APPARATUS FOR HEAD TRACKED DISPLAY OF PRECOMPUTED STEREO IMAGES

BACKGROUND OF THE INVENTION

1. Field of the Invention

This invention relates to the field of computer graphics systems. More particularly, this invention relates to real time generation of complex high resolution stereo 3D images in a head tracked stereo display system.

2. Art Background

The human eye can be modeled as an optical system coupled to a retina, with the retina functioning as a light transducer. The human eye is immersed in physical space filled with light rays. A point source of light exists at every point in the physical space that is a boundary between transparent and opaque surfaces, or a boundary between transparent surfaces of different refractive indices. Human stereo vision is achieved by immersing the two eyes at different locations within the physical space.

A typical computer graphics system generates images by producing an image plane of light sources, or an image plane of reflectors of light. Such an image plane is approximated by a two dimensional array of point light sources known as pixels. The light produced by the image plane is the sum of the half spheres of light expanding out from each pixel on the image plane. The color and intensity of each pixel is separately controllable, but the distribution of color and intensity across the half sphere usually is not controllable. The pixels that comprise the image plane appear substantially the same when viewed from any angle.

Nevertheless, a head tracked stereo display system simulates the interaction of human eyes with the light rays of the physical space in order to enable a viewer to perceive 3D images. A head tracked stereo display system senses the location in physical space of the viewer's head and eyes, computes a pair of stereo images of a virtual object based upon the location of the head and eyes, and generates the stereo image on a stereo display device.

A head tracked stereo display system requires that only two images be computed and generated at a time, which results in substantially less computation than holographic systems. Moreover, the pair of stereo images have the same appearance as a hologram. With a head tracked stereo display system, the virtual object appears to remain stationary when the viewer's head tilts, or when the viewer's head moves to look around the side or over the top of the virtual object. For further discussion regarding head tracked stereo display systems, refer to Paley, W. B. *Head-tracking Stereo Display, Techniques and Applications*, Proceedings of SPIE, Febuary 1992.

In a head tracked stereo display system, the scenery and objects of the stereo images must be rendered in a sufficiently short time span to be physiologically acceptable to the human visual system. Past head tracked stereo display systems used commonly available 3D computer graphics image generation hardware and software to produce stereo images with 3D display primitives. However, the performance of such systems is limited by the speed of the 3D graphics rendering hardware. As the complexity of the stereo images increases, the graphics rendering hardware becomes too slow to generate 3D stereo images at an acceptable rate.

As will be described, the present method and apparatus generates complex 3D stereo images by dynamically accessing pairs of stero images selected from among a precomputed set of images. The precomputed images are selected based upon a prediction of viewer head location for the next frame of the stereo display.

This application is related to application Ser. No. 07/875,042, filed on Apr. 28, 1992, entitled Method and Apparatus for High Resolution Virtual Reality Systems Using Head Tracked Display.

SUMMARY OF THE INVENTION

A method and apparatus is disclosed for generating complex 3D stereo images in response to real time viewer head movement by dynamically accessing pairs of stereo images selected from among a precomputed set of images. The precomputed images correspond to a predetermined set of possible viewpoints in a display plate coordinate (DPC) space registered to the display screen of a display device. The precomputed images are generated in batch mode by the graphics rendering system. Alternatively, the precomputed images are previously acquired images from the physical world, sampled at precise positions in space corresponding to the first nodal point of the camera.

A head tracker is used to actively track the dynamic location of a viewer's head. As an image frame is displayed, a predicted location and orientation of the viewer's head for the next frame on the stereo display is extrapolated based upon interpolation of the viewer's head movements. The predicted eyeball locations for the viewer are then determined from the predicted head location and orientation. Thereafter, predicted locations of the viewer's eye first nodal points in the DPC space are determined from the predicted eyeball locations. The predicted locations of the viewer's eye first nodal points in the DPC space are used to select a pair of stereo images from among the set of precomputed images. The stereo images are selected by determining the two viewpoints of the predetermined set of possible viewpoints having the closest proximity in the DPC space to the predicted eye first nodal points for the viewer.

The arrangement of predetermined viewpoints may be along one, two, or three dimensions. To increase the number of precomputed or pre-acquired images that can be stored, the images are compressed before being stored. If the appearance of the virtual object remains constant over time, then only one image is stored for each of the predetermined set of viewpoints. However, if the appearance of the virtual object changes over time, then multiple images are stored for each of the predetermined set of viewpoints.

A first alternative embodiment generates presampled images of an image scene, wherein the appearance of the image scene changes with the viewpoint perspective. This embodiment enables a viewer to perceive a 3D stereo reproduction of the image scene that changes appearance as the viewer's head moves through the presampled viewpoints.

A second alternative embodiment generates complex 3D stereo reproductions of an image scene in response to real time viewer head movement by dynamically accessing pairs of live video images. The live video images are generated by a set of video cameras which sample live images of the image scene. A stereo CRT generates a 3D stereo reproduction of the image scene according to a head track prediction.

BRIEF DESCRIPTION OF THE DRAWINGS

FIGS. 7a-7c illustrate a first alternative embodiment for generating presampled images corresponding to presampled viewpoints of an image scene, wherein the appearance of the image scene changes with the viewpoint perspective.

DETAILED DESCRIPTION OF THE INVENTION

A method and apparatus is disclosed for generating complex 3D stereo images in response to real time viewer head movement by dynamically accessing pairs of stereo images selected from among a precomputed set of images. The precomputed images are selected based upon a prediction of viewer head location for the next frame of the stereo display. In the following description for purposes of explanation, specific applications, numbers, apparatus and configurations are set forth in order to provide a thorough understanding of the present invention. However, it will be apparent to one skilled in the art that the present invention may be practiced without these specific details. In other instances, well known systems are shown in diagrammatical or block diagram form in order not to obscure the present invention unnecessarily.

Figure 1:
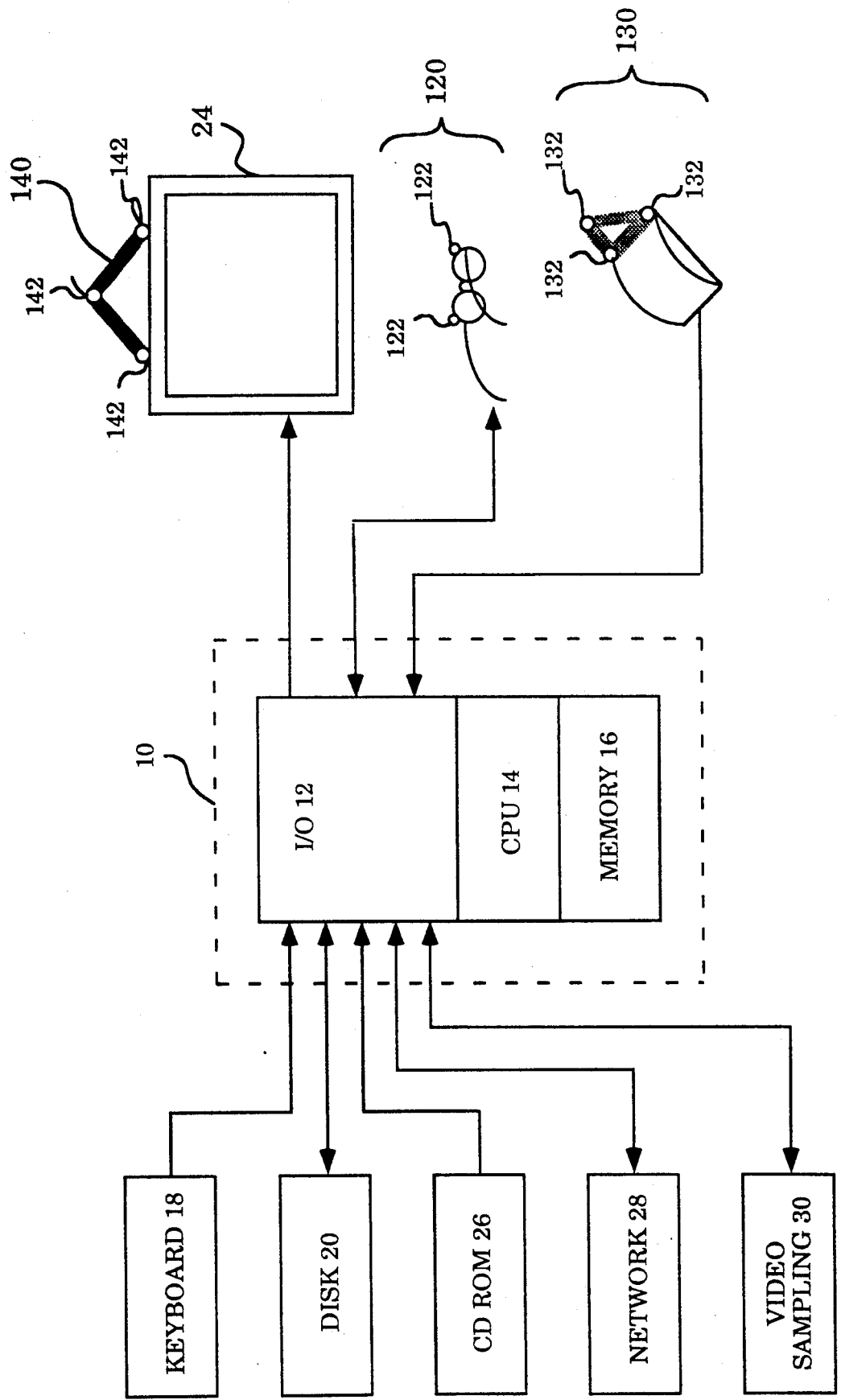
FIG. 1 illustrates a computer system incorporating the teachings of the present invention, including a stereo CRT, stereo shuttered glasses, and a 3D head tracker.

Referring now to FIG. 1, an exemplary computer based system for generating graphic images and responding to a user's input in accordance with the teachings of the present invention is illustrated. Shown is a computer 10 comprised of three major components. The first of these is an input/output (I/O) circuit 12 which is used to communicate information in appropriately structured form to and from other portions of the computer 10. In addition, the computer 10 includes a central processing unit (CPU) 14 coupled to the I/O circuit 12 and a memory 16. These elements are those typically found in most general purpose computers, and, in fact, the computer 10 is intended to be representative of a broad category of computer systems.

A magnetic disk 20 is shown coupled to the I/O circuit 12 to provide additional storage capability for the computer 10. As is well known, the disk 20 may store other computer programs, characters, routines, images, etc., which may be accessed and executed by the CPU 14. It will be appreciated that additional devices may be coupled to the computer 10 for storing data such as magnetic tape drives, as well as networks which are in turn coupled to other computer systems.

A CD ROM 20 is shown coupled to the I/O circuit 12 to provide an additional storage capability for distributing precomputed 3D stereo images in accordance with the teachings of the present invention. Also, a network controller 28 is shown coupled to the I/O circuit 12. The network controller 28 may be used to receive precomputed 3D stereo images over a communication network from a network server (not shown), and transfer the precomputed images to other portions of the computer system 10.

A video sampling unit 30 is shown coupled to the I/O circuit 12. The video sampling unit 30 receives video signals from one or more external video cameras, and digitizes received video images. As will be described, the video images received by the video sampling unit 30 may be used as the precomputed images in accordance with the teachings of the present invention.

A raster display device 24 is shown coupled to the I/O circuit 12 and is used to display images generated by the CPU 14 in accordance to the teachings of the present invention. A wide variety of raster (or pixel mapped) display devices may be utilized as display device 24. In the current embodiment, the display device 24 comprises a stereo CRT.

A keyboard 18 is shown coupled to the I/O circuit 12 and is used to input data and commands into the computer 10, as is well known. A pair of stereo shuttered glasses 120 is shown coupled to the I/O circuit 12. The stereo shuttered glasses 120 include a pair of embedded ultrasonic receivers 122 for receiving ultrasonic sound waves. The stereo shuttered glasses also have embedded an infrared controlled switch for controlling the shuttered lenses.

A 3D 6-axis mouse 130 is shown coupled to the I/O circuit 12. The 3D mouse 130 includes a set of three ultrasonic receivers 132 for receiving ultrasonic sound waves. The 3D positions of the 3D mouse 130 and the shuttered glasses 120, relative to the display surface of the stereo CRT 24, are sensed by a 3D 6-axis head-tracker 140, which is mounted to the stereo CRT 24. The 3D head tracker 140 has embedded three ultrasonic transmitters 142 that generate the ultrasonic sound waves received by the ultrasonic receivers 122 and 132.

Figure 2:
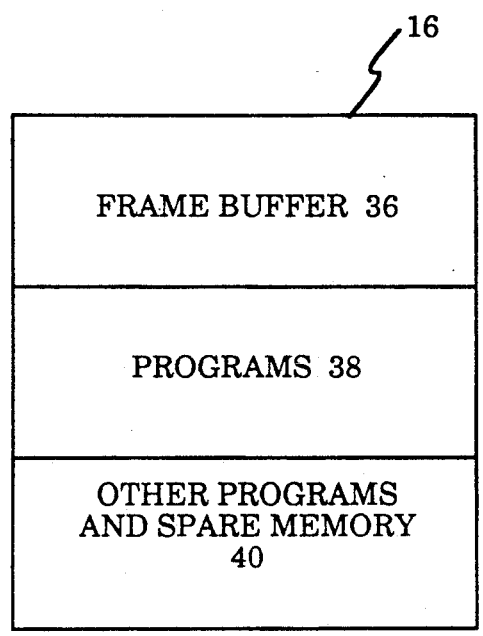
FIG. 2 shows an example arrangement of program storage and frame buffer storage for the system of FIG. 1.

Referring now to FIG. 2, one arrangement of major programs contained within the memory 16 illustrated in FIG. 1 is shown. In particular, there is shown a frame buffer 36, which serves as a pixel map of the display 24. The frame buffer 36 represents the video memory for the display 24, wherein, each storage location in the frame buffer 36 corresponds to a left or right eye pixel on the stereo CRT 24. Thus, the frame buffer 36 comprises a two dimensional array of points having known coordinates corresponding to the pixels on the stereo CRT 24. The frame buffer 36 is preferably arranged as a double buffer, such than and image can be accessed from one buffer while another image is being displayed from the other buffer.

The memory 16 also comprises a variety of programs executed by the CPU 10 that implement functions according to the teaching of the present invention, as disclosed in this specification. Additionally, the memory 16 further comprises other programs for controlling or performing other well known functions and operation on computer systems.

In the current embodiment, the viewer wears the stereo shuttered glasses 120, and may manipulate the 3D 6-axis mouse 130. The 3D positions of the 3D mouse 130 and the shuttered glasses 120, relative to the display surface of the stereo CRT 24, are sensed by a 3D 6-axis head-tracker 140, which is mounted to the stereo CRT 24. The travel time of the ultrasonic sound waves, between the ultrasonic receivers 122 and 132 and the ultrasonic transmitters 142, are used to triangulate the 3D positions of the shuttered glasses 120 and 3D mouse 130. The 3D mouse 130 is used to manipulate a virtual image perceived by the viewer.

In a head tracked stereo display system, a stereo viewing display pipeline is specified by two 4×4 perspective viewing matrices (effectively, one monocular pipeline for each eye). These matrices implicity contain information about the overall physical configuration of the viewing. Each resulting matrix includes a skew component.

The physical configuration of the viewing is determined by the location of the stereo CRT 24 in 3-space and the dynamic location of the viewer's eyes. When these parameters are known, the viewing matrices are unique to within a scale factor. The viewing matrix for each eye corresponds to a pyramid having a tip at the viewer's eye and a base defined by the four corners of the display window within the display surface of the stereo CRT 24. The front and back clipping planes are parallel to the plane of the stereo CRT 24 display surface, if the display surface is assumed to be perfectly flat.

For discussion of a high resolution virtual reality system that corrects inaccuracies caused by the flat display surface assumption, refer to related application Ser. No. 07/875,042, filed on Apr. 28, 1992, entitled *Method and Apparatus for High Resolution Virtual Reality Systems Using Head Tracked Display*, and incorporated fully herein by reference.

In the current embodiment, a computer graphics application specifies the relationship between physical coordinates and virtual coordinates (VC) by a matrix P. The relative position, orientation, and scale implied by the matrix P specify how the virtual and physical worlds are to be superimposed. (This scale factor is denoted g). The physical configuration of the stereo display device and the sensed real time location of the viewer's eye's contribute the remainder of the information necessary to the final 4×4 viewing matrices. The final 4×4 viewing matrices are used a parameters for the graphics rendering system implemented on the computer system 10.

Figure 3:
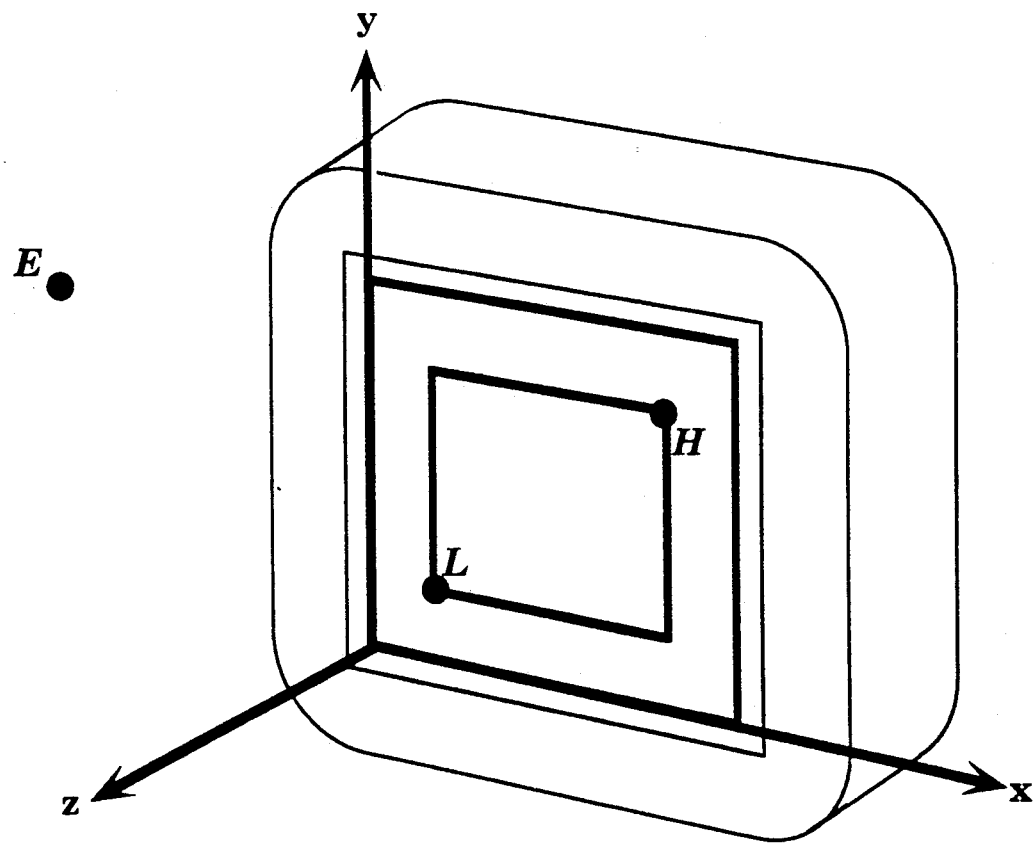
FIG. 3 illustrates an example display plate coordinates (DPC) system, which is a physical coordinate system registered to a display device's display surface.

To implement the teachings of the present invention, the stereo CRT 24 is regarded as having a physical coordinate system registered to its display surface. This physical coordinate system is hereinafter referred to as display plate coordinates (DPC). Referring to FIG. 3, an example DPC coordinate system is illustrated. DPC has its origin at the lower left hand corner of the visible raster. The x axis proceeds horizontally to the right. The y axis proceeds vertically upwards. The z axis is normal to the display surface, with positive coordinates out towards the viewer.

A window on the display surface is defined by specifying a lower left hand and an upper right hand corner for the window as two DPC points L and H on the z=0 plane. Each of the viewer's eyes has a separate coordinate in the DPC space. An example coordinate of a single eyepoint is denoted E. The front and back clipping planes are at distance F and B along the z axis. For further discussion, refer to Foley, J. D., van Dam, A., Feiner, S. K., and Hughes, J. F., *Computer Graphics: Principles and Practice*, 2nd ed., Addison-Wesley, 1990.

The view matrix P for a single eye, expressed in column vector matrix format, that maps visible points in DPC into the extended unit cube of $[-1+1]$ $[-1+1]$ $[-1+1]$, is as follows:

$$P = \begin{bmatrix} \frac{2 \cdot E_z}{H_x - L_x} & 0 & \frac{H_x + L_x - 2 \cdot E_x}{H_x - L_x} & \frac{-E_z \cdot (H_x + L_x)}{H_x - L_x} \\ 0 & \frac{2 \cdot E_z}{H_y - L_y} & \frac{H_y + L_y - 2 \cdot E_y}{H_y - L_y} & \frac{-E_z \cdot (H_y + L_y)}{H_y - L_y} \\ 0 & 0 & \frac{B + F - 2 \cdot E_z}{B - F} & B - E_z - B \cdot \frac{B + F - 2 \cdot E_z}{B - F} \\ 0 & 0 & -1 & E_z \end{bmatrix}$$

The equations above apply to display devices such as the stereo CRT 24, as well as projection stereo displays and stereo LCD panels. It should be noted that the interocular distance, which is the distance between the viewer's eyes, is not directly represented in the view matrix P.

In a head-tracking display system, parallax on the display surface is not necessarily horizontal. If a viewer observes the display with eyes oriented vertically, then the parallax at the screen will be completely vertical. The amount of parallax at the screen is not consistent even for a given head distance and object location. When a viewers head is turned 30° to one side of the screen, the parallax at the screen surface is less than when the screen is squarely faced.

Figure 9:
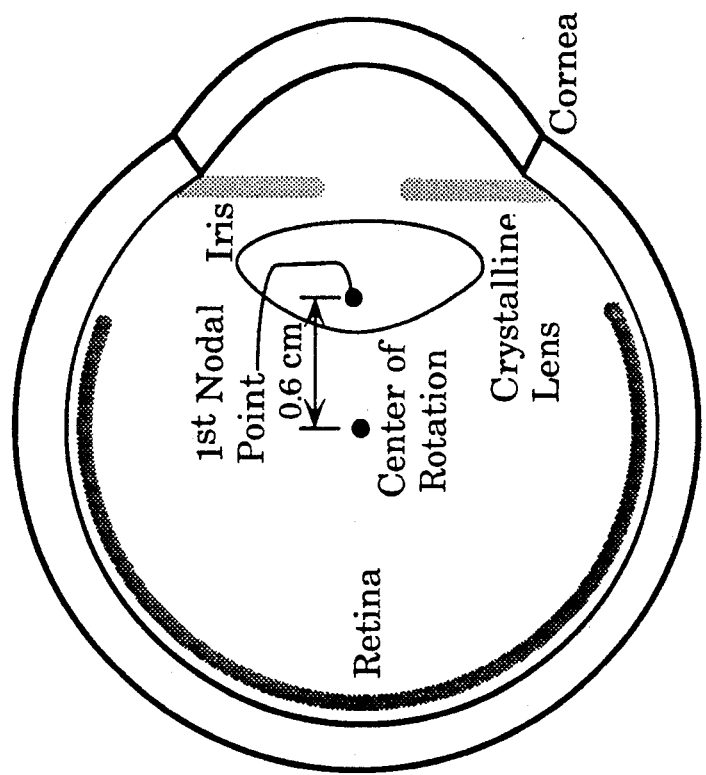
FIG. 9 provides a schematic illustration of the human eye, which can be modeled as a compound lens system with two lenses. This model of the human eye is used to determine proper viewpoints for a viewer during dynamic head-tracking.

In traditional computer graphics, the viewing projection point is referred to as the "eyepoint" or "viewpoint" and is intended to correspond to the viewer's eye. However, for the purposes of accurate display, the viewpoint location must be accurately identified physiologically. In general optical terms, the viewpoint of a lens system is the first nodal point. Referring now to FIG. 9, the human eye can be modeled as a compound lens system with two lenses. The first nodal point of this system lies inside the second lens, approximately 0.6 cm from the center of the eye. Bespectacled viewers may require a more complex model.

Because the real "eyepoint" does not lie at the center of rotation of the eye, the exact location of the eyepoint changes slightly depending on the direction of the viewer's gaze. As the eye can readily rotate ±45° or more from the center during normal viewing, this represents a potential displacement of eyepoint location of about ±0.4 cm.

Accurate viewpoint location for the nodal points of the eye can be achieved by using eye tracking hardware to acquire information about the direction of gaze of each of the viewer's eyes. The combination of gaze information and head and eye location can be used to accurately locate the eye first nodal points in the DPC space. In addition, the gaze direction information can be used for identifying the region of the display surface space that corresponds to the fovial portion of the retina, and that deserves to be rendered with high spatial detail.

Alternatively, errors due to uncertainty in eye first nodal print location can be minimized by anticipating the likely direction of the viewer's gaze. The likely direction of the viewer's gaze may be the center of the stereo window on the stereo CRT 24. When the 3D mouse 130 is employed, the viewer's gaze is likely to be in the direction of the "hot spot" of an interactive virtual image, as it is likely that the tightest accuracy requirement reflects "touching" the mouse to a virtual object. Choosing the direction of the viewer's gaze at the tip of the 3D mouse 130 compensates for errors due to rotation of the eyes. Moreover, the image rendering software implemented on the computer system 10 maintains DPC coordinates for the "hot spot" of the stereo image displayed on the stereo CRT 24.

The current embodiment of the present invention employs an ultrasonic tracking device 140 to acquire dynamic viewer head location and orientation within the DPC space. However, it should be noted that the present method does not depend on the tracking technology used. Head location and orientation data is used to derive the rotational centers of the viewer's eyes in real time using fixed vectors from the location of the head tracker 140 to the viewer's eyes.

The interocular distance of a viewer's head can very between individuals by as much as ±2 cm. In the current embodiment, the fixed vectors from the head tracker 140 to the viewer's eyes are viewer specific in order to account for the interocular distance of a given viewer. The fixed vectors also account for the registration of the head tracking device to the viewer's head.

In order for viewer to perceive computer generated objects as three dimensional physical objects, it is necessary to have a display frame rate sufficient for motion fusion. With stereo imagery there is the additional phenomenon of induced stereo movement, wherein objects displayed at a low frame rate appear to deform and twist. For further discussion, refer to Tyler, C. W., *Induced Stereo movement*, Vision Res., Vol 14, 609–613, Pergamon Press, 1974.

The performance of the 3D graphics rendering hardware employed by a head tracked stereo display system limits the complexity of stereo images that can be generated. Rendering performance limits image complexity because there is an upper limit on available time for computing and displaying a next pair of stereo images as the viewer's head moves. The upper limit is determined by the flicker fusion rate acceptable to the human visual system.

The present method and apparatus generates complex stereo images in response to real time viewer head movement by dynamically accessing pairs of stereo images selected from among a precomputed or pre-acquired set of images. The precomputed or pre-acquired images correspond to a predetermined set of possible viewpoints is the DPC space. A forward prediction of viewer head location for a next frame of the stereo CRT 24 is used to specify the precomputed stereo images for retrieval and display.

The precomputed images corresponding to the predetermined set of viewpoints are generated in batch mode by the graphics rendering system implemented on the computer system 10. A wide variety of graphics rendering methods can be used to generated the precomputed or pre-acquired images. In the current embodiment, the precomputed images are generated by the computer system 10 using the 4×4 viewing matrix pipeline discussed above. Alternatively, the pre-acquired images can be digitized image samples generated by a camera device selectively positioned such that the optical first nodal point of the camera device corresponds to the predetermined viewpoints.

The head tracker 140 is used to actively track the dynamic location of a viewer's head. As an image frame is displayed on the stereo CRT 24, a predicted location and orientation of the viewer's head for the next frame on the stereo CRT 24 is extrapolated based upon linear interpolation of the viewer's head movements. A filter is used to ramp down the head location prediction function at small head velocities in order to reduce jitter of the stereo image when the viewer's head is still, or for very fine head movements.

The predicted eyeball locations for the viewer are then computed from the predicted head location and orientation. In order to accurately compute the eyeball locations, viewer specific interocular distance information is maintained for each viewer using the present head tracked stereo display system. The predicted location of the viewer's eye first nodal points in the DPC space for the next frame on the stereo CRT 24 are computed from the predicted eyeball locations.

It should be noted that improved head location and orientation prediction may be possible if a head tracking device providing velocity and acceleration data is employed. Moreover, a variety of head tracking devices, as well as higher order head track prediction functions, may be used without departing from the spirit and scope of the present invention.

The predicted locations of the viewer's eye first nodal points in the DPC space for the next frame of the stereo CRT 24 are used to select a pair of stereo images from among a set of precomputed or pre-acquired images. As discussed above, the precomputed or pre-acquired images correspond to a predetermined set of possible viewpoints in the DPC space. The stereo images are selected by determining the two viewpoints of the predetermined set of possible viewpoints having the closest proximity in the DPC space to the predicted eye first nodal points.

Figure 4B:
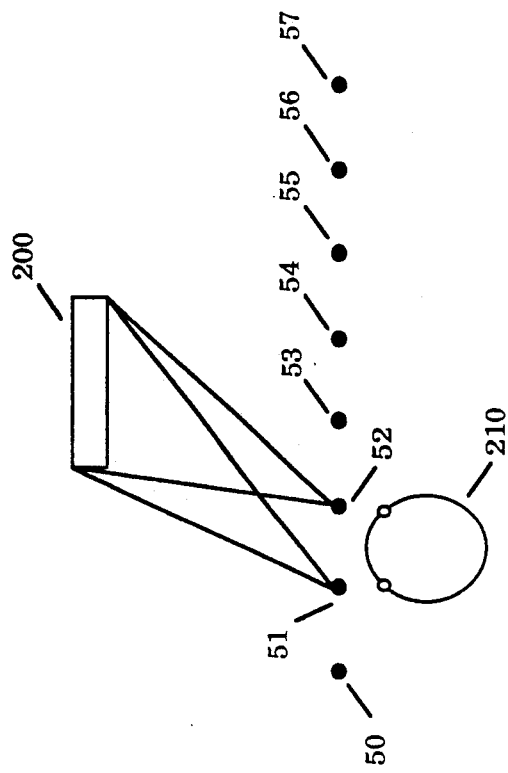
FIGS. 4a-4c illustrate example arrangements of predetermined viewpoints that are consistent with the teachings of the present invention, and show the one dimensional geometry of the projection matrices for the viewpoints in closest proximity to the predicted eye first nodal points of a viewer.
Figure 4A:
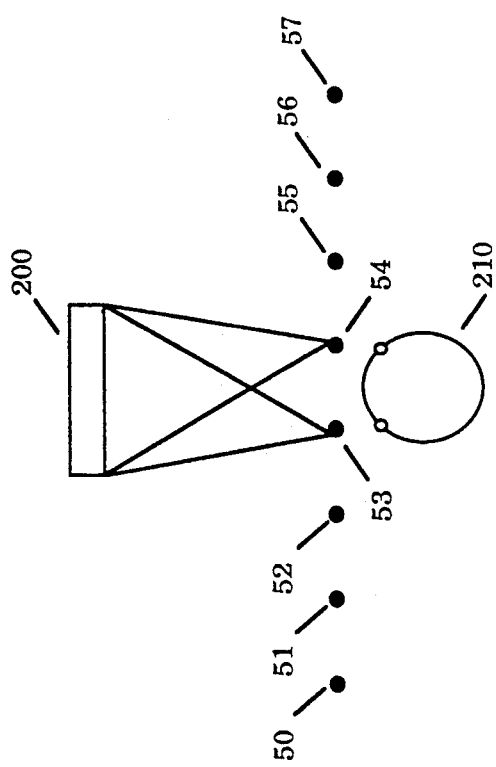
Figure 4C:
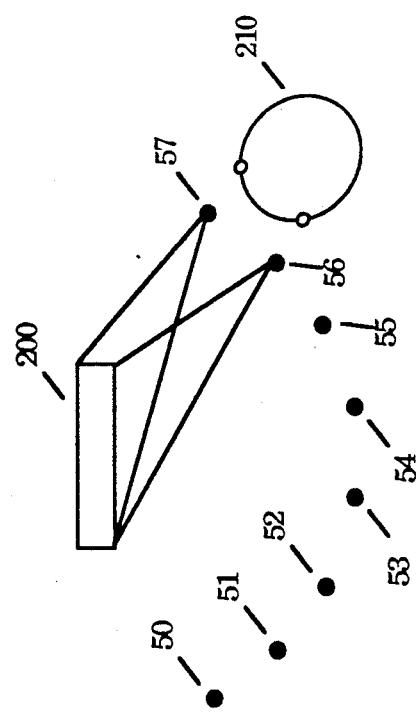

FIGS. 4a–4c illustrate an example predetermined set of possible viewpoints 50–57 that are consistent with the teachings of the present invention. Also shown is the one dimensional geometry of the projection matrices for the viewpoints in closest proximity to the predicted eye first nodal points of a viewer 210.

In the example shown in FIGS. 4a–4b, the viewpoints 50–57 lie on a straight line parallel to the virtual object 200. This arrangement of predetermined viewpoints allows the viewer 210 to perceived an accurate 3D stereo image during lateral head movement along the line.

In the current embodiment, the computer system 10 precomputes images of the virtual object 200 corresponding to the viewpoint perspectives of the viewpoints 50–57. The precomputed images are generated in batch mode on the computer system 10, which enables arbitrarily complex images to be generated for the viewpoints 50–57 without the time constraints of real time generation.

The precomputed or pre-acquired images corresponding to the viewpoints 50–57 can be accessed from the memory 16, the disk device 20, or can be accessed over a network by the network controller 28. Also, the precomputed or pre-acquired images can be stored and distributed using the CD ROM 26, which provides storage capacity for large numbers of complex precomputed or pre-acquired images. The precomputed or pre-acquired images distributed on CD can be copied to the disk device 20 if the access time of the CD ROM is too slow to accomplish the desired frame rate on the stereo CRT 24.

The head tracker 140 senses the location in the DPC space of the shuttered glasses 120 worn by the viewer 210. As the head of the viewer 210 moves within the DPC space, the predicted location and orientation of the viewer's head for the next frame of the stereo CRT 24 is extrapolated. Thereafter, the predicted eyeball locations of the viewer 210 are computed from the predicted head location and orientation, and the location of the eye first nodal points in the DPC space of the viewer 210 are computed from the eyeball locations.

In the example shown in FIG. 4a, the predicted eye first nodal points in the DPC space of the viewer 210 are closest to the viewpoints 53 and 54. Therefore, the precomputed or pre-acquired images corresponding to the viewpoints 53 and 54 must be displayed on the stereo CRT 24 to provide the viewer 210 the proper stereo views of the virtual object 200. As a result, the precomputed or pre-acquired images corresponding to the viewpoints 53 and 54 are retrieved from storage and copied into the frame buffer 36 for display on the stereo CRT 24 during the next frame.

FIG. 4b shows the predicted eye first nodal points in the DPC space of the viewer 210 displaced laterally along the line defined by the viewpoints 50–57. In this example, the predicted eye first nodal points are closest to the viewpoints 51 and 52. Thus, the precomputed or pre-acquired images corresponding to the viewpoints 51 and 52 are retrieved and copied into the frame buffer 36 for display on the stereo CRT 24 during the next frame.

FIG. 4c illustrates an example predetermined set of viewpoints 50–57 that lie in on curved line around the virtual object 200. Also shown is the one dimensional geometry of the projection matrices corresponding to the viewpoints in closest proximity to the predicted eye first nodal points of the viewer 210. This example set of predetermined viewpoints allows the viewer 210 to perceive an accurate stereo image during head movement along the curved line defined by the viewpoints 50–57.

With the predicted head location for the viewer 210 as shown, the predicted eye first nodal points are closest to the viewpoints 56 and 57. Therefore, the precomputed or pre-acquired images corresponding to the viewpoints 56 and 57 are retrieved and copied into the frame buffer 36 for display on the stereo CRT 24 during the next frame.

Figure 5A:
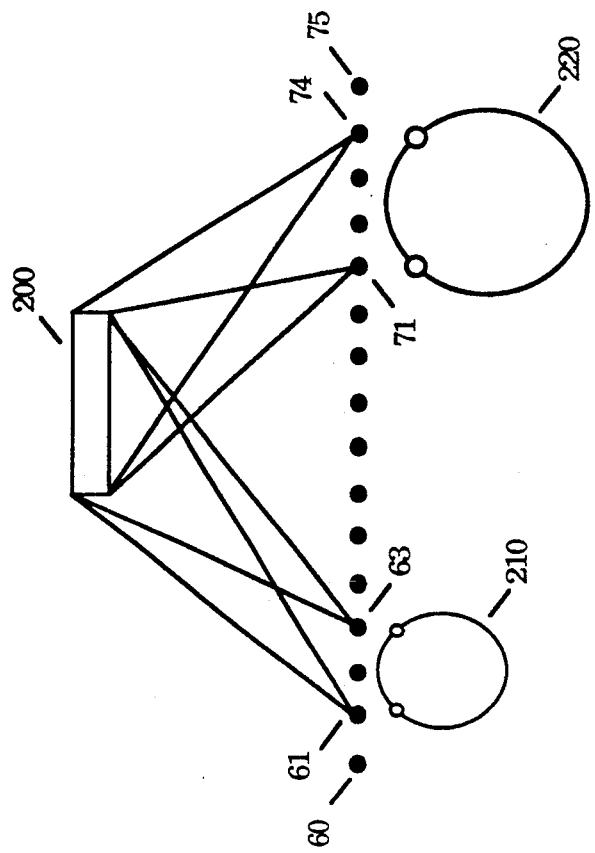
FIGS. 5a-5b illustrate an example arrangement of predetermined viewpoints that can accommodate viewers having differing interocular distances, along with the one dimensional geometry of the projection matrices corresponding to the viewpoints in closest proximity to the predicted eye first nodal points of the viewers.
Figure 5B:
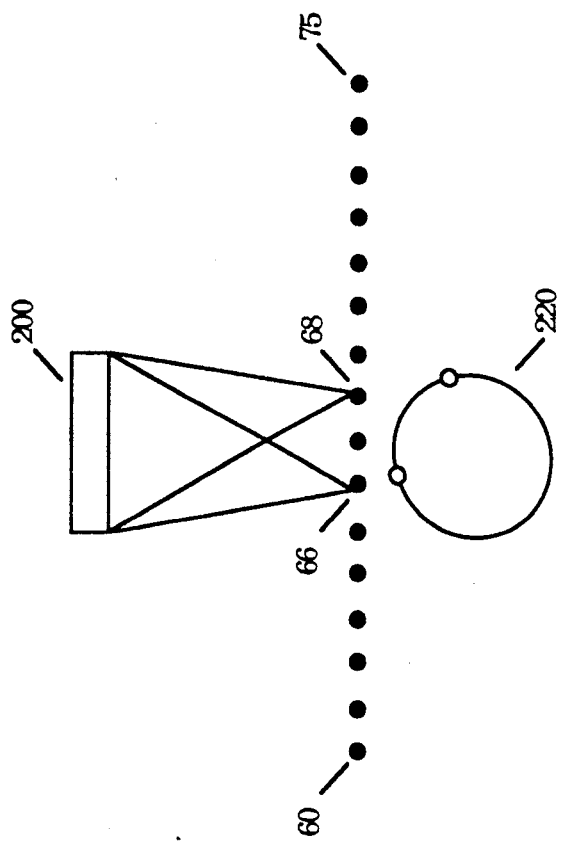

FIGS. 5a–5b illustrate an arrangement of predetermined viewpoints that can accommodate viewers having differing interocular distances. In this example, a viewer 220 has an interocular distance greater than the interocular distance of the viewer 210. A predetermined set of viewpoints 60–75 is shown, along with the one dimensional geometry of the projection matrices corresponding to the viewpoints in closest proximity to the predicted eye first nodal points of the viewers 210 and 220. As before, the precomputed or pre-acquired images corresponding to the viewpoints 60–75 may be accessed from the memory 16, the disk device 20, the CD ROM device 26, or may be accessed over a network by network controller 28.

The viewpoints 60–75 lie on a straight line parallel to the virtual object 200. This arrangement allows the viewer 210 or the viewer 220 to perceive an accurate stereo image during lateral head movement along the line. As previously described, the present method accounts for viewer specific eye spacing when determining the predicted location of the eye first nodal points of the particular viewer.

In the example of FIG. 5a, the predicted eye first nodal points in the DPC space of the viewer 210 are closest to the viewpoints 61 and 63. Therefore, the precomputed or pre-acquired images corresponding to the viewpoints 61 and 63 are retrieved and copied into the frame buffer 36 for display on the stereo CRT 24 during the next frame when tracking the head movements of the viewer 210. However, the predicted eye first nodal points in the DPC space of the viewer 220 are more widely space, and are closest to the viewpoints 71 and 74. As a result, the precomputed or pre-acquired images corresponding to the viewpoints 71 and 74 are retrieved and copied into the frame buffer 36 for display on the stereo CRT 24 during the next frame when tracking the head movements of the viewer 220.

In the example of FIG. 5b, the predicted location and orientation of the head of the viewer 220 is shown turned to the right. Therefore, the eye first nodal points for the viewer 220 are closest to the viewpoints 66 and 68. The illustrated orientation of the head of the viewer 220 results in the selection of a narrower viewpoint spacing than if the eyes of the viewer 220 were oriented parallel to the virtual object 200. As a consequence, the precomputed or pre-acquired images corresponding to the viewpoints 66 and 68 are retrieved and copied into the frame buffer 36 for display on the stereo CRT 24 during the next frame.

In the above examples, the predetermined viewpoints are arranged along a straight or curved line. However, the predetermined viewpoints can be arranged in one, two, as well as three dimensions.

Figure 6:
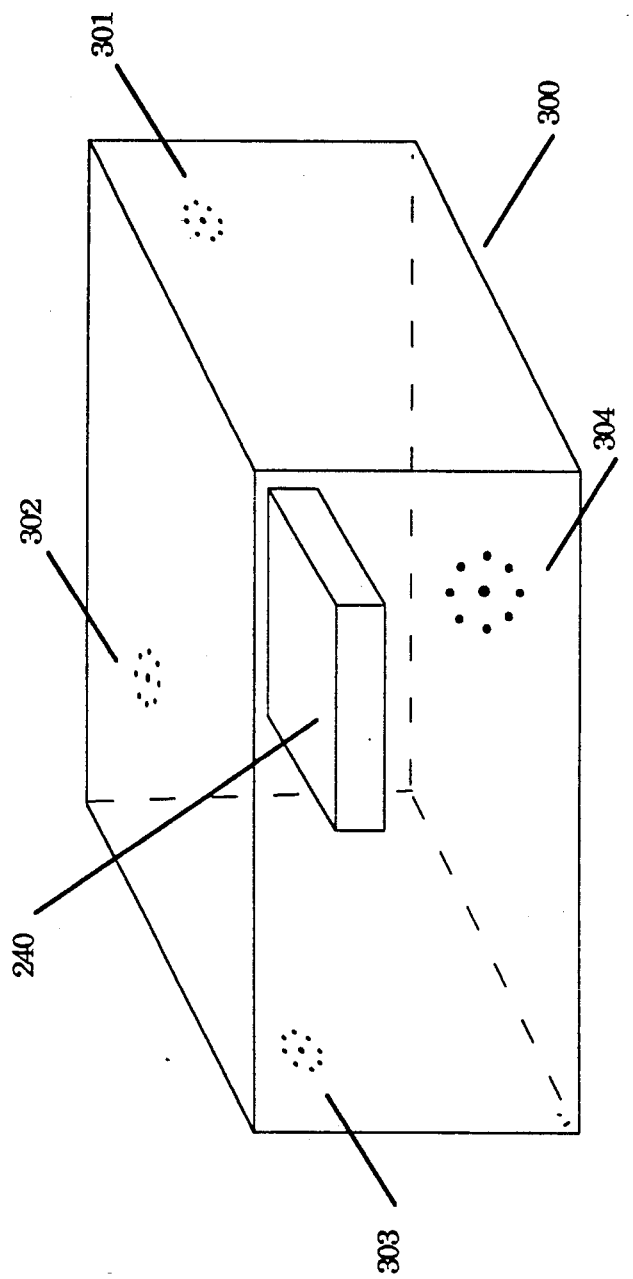
FIG. 6 shows an example three dimensional arrangement of predetermined viewpoints of a virtual object, wherein the predetermined viewpoints are arranged as sets of viewpoint clusters contained within a cube.

Referring to FIG. 6, an example three dimensional arrangement of predetermined viewpoints for the virtual object 240 is illustrated. In this example, the predetermined viewpoints are arranged as sets of viewpoint clusters 301–304 contained within a cube 300. As before, the precomputed or pre-acquired images corresponding to the predetermined viewpoint clusters 301–304 may be stored in the memory 16, on the disk device 20, on the CD ROM device 26, or may be received over a network by network controller 28.

The viewpoint clusters 301–304 enable a viewer to perceive a complex 3D stereo image of the virtual object 240 when the movement of the viewer's head is within one of the clusters 301–304. The cluster arrangement enables the viewer to perceive small changes in the 3D image as the viewer makes head movements within the cluster. As will be described, a cluster arrangement is particularly useful when data compression of the precomputed or pre-acquired images is employed.

The present method and apparatus generates complex stereo images of a virtual object in response to real time viewer head movement for virtual objects having constant and time varying appearance. If, for example, the appearance of the virtual object 240 remains constant over time, then only one image is precomputed for each of the predetermined viewpoints in the viewpoint clusters 301–304. For such a constant appearance virtual object, the precomputed or pre-acquired images that are retrieved and copied into the frame buffer 36 vary only in the viewing perspective of the virtual object 240.

However, if the appearance of the virtual object 240 changes appearance over time, then multiple precomputed or pre-acquired images of the virtual object 240 are generated for each of the predetermined viewpoints in the viewpoint clusters 301–304. The precomputed or pre-acquired images that are retrieved and copied into the frame buffer 36 vary in both viewing perspective and appearance of the virtual object 240.

For a virtual object that changes appearance over time, the predicted location of the viewer's eye first nodal points in the DPC space for the next frame of the stereo CRT 24 are used in conjunction with a time index to select a pair of stereo images from among the set of precomputed or pre-acquired images. The stereo images are selected by determining the two proximate viewpoints of the predetermined set of possible viewpoints having the closest proximity in the DPC space to the predicted eye first nodal points for the viewer, and by using the time index to select one of the multiple precomputed or pre-acquired images corresponding to each of the two proximate viewpoints. The time index can be real time or multi-media sync.

The precomputed or pre-acquired images of a virtual object that changes appearance over time are generated in batch mode by the graphics rendering system implemented on the computer system 10. For each of the predetermined viewpoints, a precomputed or pre-acquired image is generated for each frame of display on the stereo CRT 24. The number of precomputed or pre-acquired images corresponding a particular predetermined viewpoint depends on the desired frame rate and the time interval over which the virtual image 240 changes appearance.

To increase the number of precomputed or pre-acquired images that can be stored, the precomputed or pre-acquired images can be compressed before being stored. Compression of the precomputed or pre-acquired images allows more images to be stored in the memory 16, on the disk device 20, and on the CD ROM 26. Compression also enables faster transfer of the precomputed or pre-acquired images from the disk 20 to the computer 10, or over a network coupled to the network controller 28, since a compressed image requires less data to be transmitted.

Image compression can be employed to compress time varying precomputed or pre-acquired images. Image compression enables representation of images for sequential display frames by a base image, along with deltas that encode information required to reconstruct the sequential images from the base image. Information common to several sequential frames is stored only once as a base image. The deltas corresponding to the remaining sequential images are also stored. As a result, the images for several sequential display frames are stored in less memory or disk space since the aggregate of the base image and the deltas contains less data than the original images.

For detailed discussion of iamge compression methods, refer to Clarke, R. J. *Transform Coding of Images*, Academic Press 1985, London, England; and Rao, K. R., and Yip, P. *Discrete Cosine Transform, Algorithms, Advantages, Applications*, Academic Press 1990, Boston, Mass.

Similarly, image compression can be employed to compress precomputed or pre-acquired images that correspond to predetermined viewpoints located in close proximity in the DPC space. The proximate images are represented by a base image, along with deltas that encode information required to reconstruct the proximate images from the base image. The deltas reflect the changes in 3D viewpoint perspective corresponding to predetermined viewpoints in close proximity to the viewpoint of the base image.

Referring again to FIG. 6, images of the object 240 corresponding to each of the viewpoint clusters 301 to 304 can be represented by a base image and a set of deltas. The base image can be chosen to correspond to the center viewpoints of the viewpoint clusters 301–304. Image compression techniques are used to encode the deltas for the images of the object 240 corresponding to the viewpoints surrounding the center viewpoints. In this manner, the images corresponding to the viewpoint clusters 301–304 require less storage space than equivalent non compressed images.

If compression is used, a forward prediction of viewer head position for the next frame is used to select the appropriate pair of stereo images for decompression into the frame buffer 36. For each frame of display, only two precomputed or pre-acquired images are selected for decompression.

If the precomputed or pre-acquired images are stored on a disk device, such as the magnetic disk 20, the prediction of viewer head position is used to "seek" to the disk area containing the images corresponding to the predicted head position. The images are copied into the frame buffer 36 for the next display frame. If the images are compressed before being stored on the disk 20, the images are transmitted to the computer 10, and decompressed into the frame buffer 36.

In the current embodiment, the amount of time available to access, decompress if necessary, and copy the precomputed or pre-acquired images into the frame buffer 36 depends upon the desired frame rate for display on the stereo CRT 24. If the images are stored on the disk 20, the forward prediction of viewer head position is used to seek to the appropriate area of the disk 20. Thereafter, the transmit time between the disk 20 and the computer 10, and the time taken to decompress the images into the frame buffer 36 sets a limit on the frame rate for display. It is preferable that the frame rate be maintained in the range between 10 and 30 frames per second according to the image quality desired. For example, if the frame rate for display on the stereo CRT is 15 frames per second, a maximum of 1/15 seconds is available to access, decompress, and copy the selected stereo image pair into the frame buffer 36.

Figure 7B:
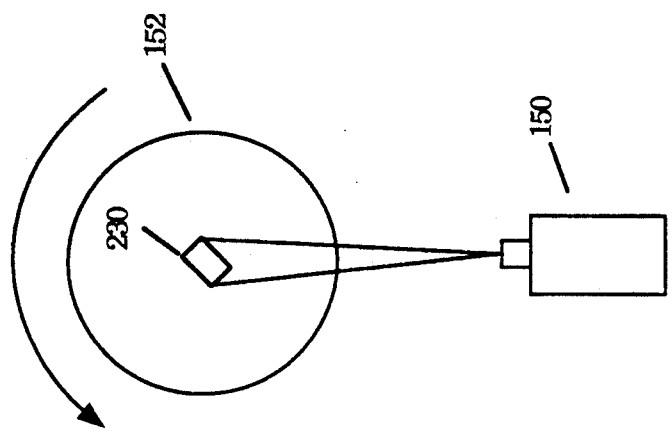
Figure 7A:
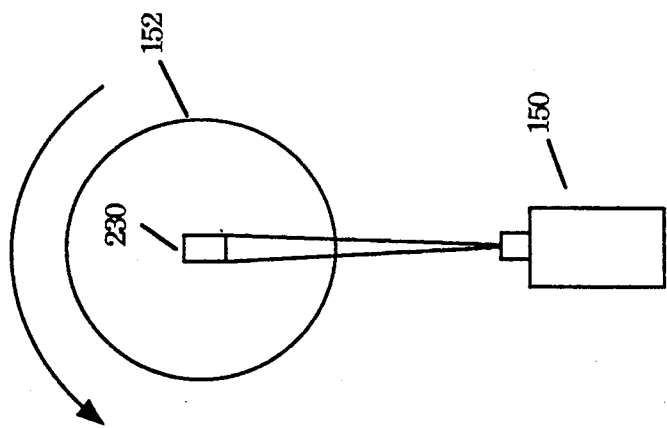

FIGS. 7a-7c illustrates a first alternative embodiment that generates a set of presampled images corresponding to a set of presampled viewpoints of an image scene. The presampled images are generated such that the appearance of the image scene changes with the viewpoint perspective. The presampled images are later used to generate a 3D stereo reproduction of the image scene in accordance with the methods discussed above. The stereo reproduction of the image scene enables a viewer to perceive the changing appearance of the image scene as the viewer's head moves through the set of predetermined viewpoints in a DPC space registered to a display screen.

In the example shown, the image scene comprises a real object 230, which is mounted on a rotating platform 152. As the rotating platform 152 turns, the appearance of the real object 230 changes as a video camera 150 generates video images for a set of presampled viewpoints. FIGS. 7a-7b show the one dimensional geometry for two presampled viewpoints of the real object 230. For each presampled viewpoint of the real object 230, the position of the nodal point of the video camera 150 in relation to the real object 230 is measured. The nodal point locations of the video camera 150 for the presampled viewpoints define a set of predetermined viewpoints for later reproduction of the real object 230.

The video output signals (not shown) of the video camera 150 are coupled to the video sampling unit 30. The video sampling unit 30 digitizes the video images generated by the video camera 150 for each presampled viewpoint, and transfers the digitized presampled images to the computer system 10 through the I/O circuit 12. Thereafter, the digitized presampled images can be stored in the memory 16, or the disk device 20, or transmitted over a network by the network controller 28.

Referring to FIG. 7c, an example set of presampled viewpoints 80-92 corresponding to a set of digitized presampled images of the real object 230 is illustrated. In this example, the viewer 210 can perceive the changing appearance of a virtual object 232, which is a recreation of the real object 230, during head movement along the semicircle defined by the viewpoints 80-92. The spatial relationship of the viewpoints 80-92 to the virtual object 232 in the DPC space registered to the display surface of the stereo CRT 24, corresponds to the spatial relationship of the presampled nodal point locations of the video camera 150 to the real object 230.

As the head of the viewer 210 moves, a predicted location of the viewer's eye first nodal points in the DPC space for the next frame of the stereo CRT 24 are used to select a pair of stereo images from among the set of digitized presampled images. The stereo images are selected by determining the two viewpoints of the presampled viewpoints 80-92 having the closest proximity in the DPC space to the predicted eye first nodal points for the viewer 210.

The example shows a predicted head location of the viewer 210, which results in the predicted eye first nodal points having closest proximity in the DPC space to the viewpoints 85 and 86. Therefore, the digitized presampled images corresponding to the viewpoints 85 and 86 are retrieved, possibly decompressed, and copied into the frame buffer 36 for display on the stereo CRT 24 during the next frame.

The appearance of the real object 230 changes as the rotating platform 152 turns, and as the video camera 150 generates the presampled images. As a consequence, the viewpoint samples generated by the video camera 150 provide viewpoint perspective information, as well as information on the time changing appearance of the real object 230. Thus, the viewer 210 perceives perspective and appearance changes of the virtual object 232 for head movement along the semicircle defined by the presampled viewpoints 80-92, even though only one presampled image is stored for each of the presampled viewpoints 80-92.

Figure 8:
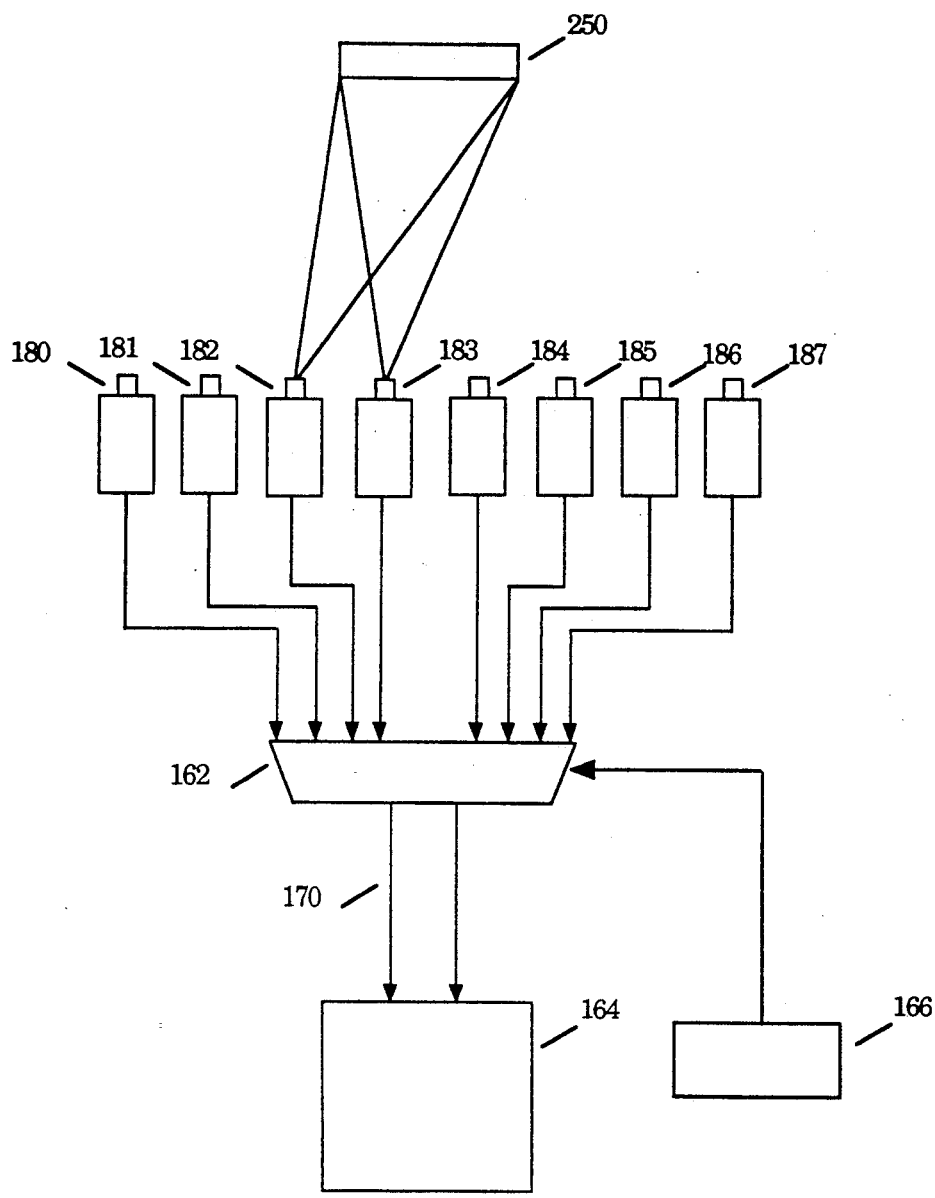
FIG. 8 illustrates a second alternative embodiment that generates complex stereo images in response to real time viewer head movement by dynamically accessing pairs of live video images.
Figure 8:
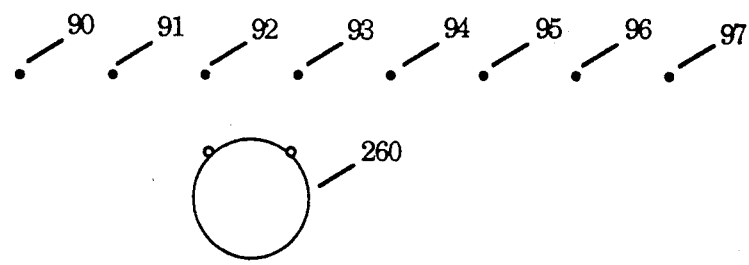

FIG. 8 illustrates a second alternative embodiment that generates a complex stereo reproduction of an image scene in response to real time viewer head movement by dynamically accessing pairs of live video images. The live video images are generated by a set of video cameras 180-187, which sample live images of the image scene. In the example shown, the image scene comprises a real object 250.

A forward prediction of the head location of the viewer 260 for the next frame of a stereo CRT 164 is used to selectively couple the video signals from the set of video cameras 180-187 to the stereo CRT 164 for display. A pair of video signals are selectively coupled to the stereo CRT 164 through a video signal multiplexer 162. The video signal multiplexer 162 is controlled by a processor 166, which also performs the head track prediction.

In a manner similar to previous embodiments, the head tracker 140 actively tracks the dynamic location of the head of the viewer 260 within a DPC space registered to the display surface of the stereo CRT 164, and a predicted location and orientation of the viewer's head for the next frame on the stereo CRT 164 is extrapolated based upon linear interpolation of the viewer's head movements. The predicted eyeball locations for the viewer 260 are then computed from the predicted head location and orientation. Finally, the predicted location of the viewer's eye first nodal points are computed from the predicted eyeball locations.

A predetermined set of viewpoints 90-97 located in the DPC space correspond to the first nodal points of the video cameras 180-187 relative to the real object 250. The processor 166 determines a pair of viewpoints from the predetermined set of possible viewpoints 90-97 having the closest proximity in the DPC space to the predicted eye first nodal points for the viewer 260. Thereafter, the video signals corresponding to the closest viewpoints are selectively coupled to the stereo CRT 164 through the video signal multiplexer 162.

In the example shown, the predicted eye first nodal points of the viewer 260 for the next frame on the stereo CRT 164 are closet to the predetermined viewpoints 92 and 93. Thus, the processor 166 causes the video signal multiplexer 162 to couple the video signals from video cameras 182 and 183 for display on the stereo CRT 164 over signal lines 170.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than restrictive.

What is claimed is:

1. A method for generating a head tracked stereo image, comprising the steps of:

(a) generating precomputed images corresponding to a set of predetermined viewpoints of a virtual object, such that the predetermined viewpoints and the virtual object are defined in a display plate coordinate space registered to a display screen of a display device;

(b) determining a time index for displaying the precomputed images in stereo on the display device;

(c) predicting an eye first nodal point for each eye of a viewer corresponding to the time index, such that the eye first nodal points are located in the display plate coordinate space;

(d) determining the predetermined viewpoints having the closest proximity in the display plate coordinate space to the eye first nodal points;

(e) accessing the precomputed images corresponding to the predetermined viewpoints having the closest proximity in the display plate coordinate space to the eye first nodal points, and transferring the precomputed images to a frame buffer;

(f) displaying the precomputed images in the frame buffer in stereo on the display device.

2. The method of claim 1, wherein step (a) comprises the steps of:

(g) selecting an arrangement in the display plate coordinate space for the predetermined viewpoints;

(h) rendering the precomputed images corresponding to the predetermined viewpoints of the virtual object using a graphics rendering system;

(i) storing the precomputed images, such that the precomputed images are accessed by specifying the corresponding predetermined viewpoint.

3. The method of claim 2, wherein step (b) comprises the step of generating the precomputed images corresponding to the predetermined viewpoints of the virtual object by image sampling a real object having the appearance of the virtual object.

4. The method of claim 2, further comprising the step of performing a data compression on the precomputed images after step (b) and before step (c).

5. The method of claim 1, wherein step (c) comprises the steps of:

(g) sensing dynamic locations and orientations of the viewer in the display plate coordinate space;

(h) determining a location and orientation of the viewer for a next frame of the display device by performing an interpolation of the dynamic locations and orientations of the viewer;

(i) determining locations of the eyeballs of the viewer in the display plate coordinate space for the next frame, based upon the location and orientation of the viewer for the next frame of the display device, and a predetermined location of the eyeballs of the viewer relative to the location of the head of the viewer;

(j) determining locations of the eye first nodal points of the viewer in the display plate coordinate space based upon the locations of the eyeballs.

6. The method of claim 5, wherein the interpolation in step (b) is reduced by a filter function at small velocities of the head of the viewer in order to reduce jitter of a stereo image when the viewer's head is still.

7. The method of claim 1, wherein step (e) comprises the steps of:

(g) retrieving the precomputed images from a storage means, such that the precomputed images are in a compressed format;

(h) decompressing the precomputed images retrieved from the storage means;

(i) storing the decompressed precomputed images into the frame buffer, such that the frame buffer is double buffered and the decompressed precomputed images are transferred to a first buffer in the frame buffer while a second buffer in the frame buffer is accessed by the display device.

8. A method for generating a head tracked stereo image, comprising the steps of:

(a) predicting an eye first nodal point for each eye of a viewer, such that the eye first nodal points correspond to points in a display plate coordinate space registered to a display screen of a display device;

(b) comparing the eye first nodal points to a set of predetermined viewpoints defined in the display plate coordinate space, each of the predetermined viewpoints corresponding to a viewpoint of a video camera generating a live video signal;

(c) determining the predetermined viewpoints having the closest proximity in the display plate coordinate space to the eye first nodal points;

(d) selectively coupling to the display device the video signals from the video cameras corresponding to the predetermined viewpoints having the closest proximity in the display plate coordinate space to the eye first nodal points;

(e) displaying the video signals in stero on the display device.

9. An apparatus for generating a head tracked stereo image, comprising:

means for generating precomputed images corresponding to a set of predetermined viewpoints of a virtual object, such that the predetermined viewpoints and the virtual object are defined in a display plate coordinate space registered to a display screen of a display device;

means for determining a time index for displaying the precomputed images in stereo on the display device;

means for predicting an eye first nodal point for each eye of a viewer corresponding to the time index, such that the eye first nodal points are located in the display plate coordinate space;

means for determining the predetermined viewpoints having the closest proximity in the display plate coordinate space to the eye first nodal points;

means for accessing the precomputed images corresponding to the predetermined viewpoints having the closest proximity in the display plate coordinate space to the eye first nodal points, and transferring the precomputed images to a frame buffer;

means for displaying the precomputed images in the frame buffer in stereo on the display device.

10. The apparatus of claim 9, wherein the means for generating precomputed images corresponding to a set of predetermined viewpoints of a virtual object comprises:

means for selecting an arrangement in the display plate coordinate space for the predetermined viewpoints;

graphics rendering means, the graphics rendering means generating the precomputed images corresponding to the predetermined viewpoints of the virtual object;

means for storing the precomputed images, such that the precomputed images are accessed by specifying the corresponding predetermined viewpoint.

11. The apparatus of claim 10, wherein the graphics rendering means comprises means for image sampling a real object having the appearance of the virtual object.

12. The apparatus of claim 10, further comprising means for performing a data compression on the precomputed images.

13. The apparatus of claim 9, wherein the means for predicting an eye first nodal point for each eye of a viewer comprises:
   means for sensing dynamic locations and orientations of the viewer in the display plate coordinate space;
   means for determining a location and orientation of the viewer for a next frame of the display device by performing an interpolation of the dynamic locations and orientations of the viewer;
   means for determining locations of the eyeballs of the viewer in the display plate coordinate space for the next frame, based upon the location and orientation of the head of the viewer for the next frame of the display device, and a predetermined location of the eyeballs of the viewer relative to the location of the head of the viewer;
   means for determining locations of the eye first nodal points of the viewer in the display plate coordinate space based upon the locations of the eyeballs.

14. The apparatus of claim 13, wherein the interpolation is reduced by a filter function at small velocities of the head of the viewer in order to reduce jitter of a stereo image when the viewer's head is still.

15. The apparatus of claim 13, wherein interocular distance for the viewer is used in addition to the location and orientation of the head of the viewer for the next frame of the display device to accurately determine the eyeball locations.

16. The apparatus of claim 9, wherein the means for accessing the precomputed images comprises:
   means for retrieving the precomputed images from a storage means, such that the precomputed images are in a compressed format;
   means for decompressing the precomputed images retrieved from the storage means;
   means for storing the decompressed precomputed images into the frame buffer, such that the frame buffer is double buffered and the decompressed precomputed images are transferred to a first buffer in the frame buffer while a second buffer in the frame buffer is accessed by the display device.

* * * * *